United States Patent [19]

Vassilakis et al.

[11] Patent Number: 5,013,699

[45] Date of Patent: May 7, 1991

[54] NOVEL ZEOLITE COMPOSITIONS DERIVED FROM ZEOLITE Y

[75] Inventors: James G. Vassilakis, New York; Donald F. Best, Mahopac, both of N.Y.

[73] Assignee: UOP, Des Plaines, Ill.

[21] Appl. No.: 417,611

[22] Filed: Oct. 5, 1989

Related U.S. Application Data

[63] Continuation-in-part of Ser. No. 178,901, Apr. 7, 1988, abandoned.

[51] Int. Cl.$^5$ .............................................. B01J 29/08
[52] U.S. Cl. .......................................... 502/73; 502/79
[58] Field of Search ................... 502/79, 86, 73, 65, 502/66

[56] References Cited

U.S. PATENT DOCUMENTS

| | | | |
|---|---|---|---|
| 3,287,282 | 11/1966 | Stiles | 502/79 |
| 3,383,169 | 5/1968 | Young | 502/79 |
| 3,405,055 | 10/1968 | Bittner | 502/86 |
| 3,493,519 | 2/1970 | Kerr et al. | 502/86 |
| 3,595,611 | 7/1971 | McDaniel et al. | 502/79 |
| 3,794,600 | 2/1974 | Schutt | 502/86 |
| 4,240,932 | 12/1980 | Alafandi et al. | 502/86 |

*Primary Examiner*—Carl F. Dees
*Attorney, Agent, or Firm*—Thomas K. McBride; Richard G. Miller

[57] ABSTRACT

Novel catalyst bases are described which are prepared by hydrothermally treating an ammonium ion exchanged sodium Y zeolite followed by low pH ammonium ion exchange to produce highly crystalline zeolite catalyst base. Catalysts incorporating such novel zeolite catalyst bases, as well as hydrocracking and fluid catalytic cracking processes for the production of gasoline products utilizing catalysts incorporating such novel catalyst bases, are also described.

6 Claims, No Drawings

NOVEL ZEOLITE COMPOSITIONS DERIVED FROM ZEOLITE Y

CROSS REFERENCE TO RELATED APPLICATION

This application is a continuation-in-part of copending U.S. application Ser. No. 178,901, filed Apr.7, 1988 now abandoned.

FIELD OF THE INVENTION

This invention relates to novel catalyst bases prepared by sequentially hydrothermally treating followed by low pH ammonium ion exchange of a previously ammonium ion exchanged sodium Y zeolite, and to catalysts incorporating same, as well as to catalytic processes including hydrocracking processes for the production of gasoline products and fluid catalytic cracking processes utilizing such catalysts.

BACKGROUND OF THE INVENTION

Catalytic hydrocracking is a petroleum refining process which is of increasing world-wide importance due to the continued need for conversion of low quality feedstocks to gasoline products.

The catalysts used in these hydrocracking processes are dual functional types, consisting of a hydrogenation component such as a Group VIII noble metal or a combination of Group VIII (Ni,Co) and Group VIB (Mo, W) metals, in combination with a solid acid catalyst, such as the LZY-B2 or LZ-10 zeolites, amorphous silica-alumina gel, transition aluminas or aluminosilicates. The latter components act as acidic cracking catalysts and they may also act as support for the metal components.

Of the solid acid components, it is generally understood that aluminosilicate zeolites are the most active in the sense that they convert the highest fraction of feedstock to lower boiling products under comparable operating conditions. Activity, however, is only one of three essential properties of a mid-barrel or gasoline hydrocracking catalyst. The other two properties are selectivity to produce the desired products (i.e., gasoline) exclusively, and stability, which is a measure of the useful operating life of the catalyst. It has been found that the high activity of strong acid zeolite catalysts does not compensate for their poor selectivity for turbine and diesel oil, and, accordingly, no commercial maximum mid-barrel catalyst utilizes strong acid zeolites as the principal acid cracking component. Instead, this function is provided either by amorphous compositions, such as silica-aluminas derived from silica-alumina gels, or by the mild acid LZ-10 zeolite, UHP-Y zeolite described in U.S. Pat. No. 4,401,556, which shows much higher selectivity and lower activity than strong acid zeolites.

The chemistry of gasoline and mid-barrel hydrocracking processes is significantly different. In gasoline hydrocracking, multiple fragmentation of the feed molecules is required. In mid-barrel hydrocracking, on the other hand, the average feedstock molecule should be split only once and very near the center of the molecule in order to maximize the mid-barrel fraction, and thereby minimize the production of light hydrocarbons, such as $C_1$–$C_4$ and gasoline. The zeolite component of catalysts employed for gasoline hydrocracking is a strong-acid zeolite, such as LZY-82, REY or LZ-210 zeolite. In the production of diesel and turbine fuels multiple chain branching and multiple cracking are undesirable, consequently, weak or mild acid catalysts are required which yield considerably less isomerization and less multiple fragmentation.

The principal prior art of which the applicants are aware are the following:

U.S. Pat. No. 3,691,099, which issued to Dean A. Young, teaches the acid treatment of zeolite (and other Al-containing refractory oxides). The patent teaches that salt/acid combination improves soda removal and "acidity" characteristics of Y zeolite. This patent is directed to the acid treatment of NaY and $NH_4Y$, not to a stabilized Y. Also, a bulk $SiO_2/Al_2O_3$ of 6-12 is reported, but, $a_o$ measurements indicate that framework $SiO_2/Al_2O_3$ was not substantially altered.

U.S. Pat. No. 3,383,169, which issued to Dean A. Young, teaches low pH ammonium exchange of NaY to improve exchange efficiency (salt usage).

U.S. Pat. No. 4,415,439, which issued to Robert L. Chiang, teaches that calcined $NH_4Y$ can be treated with acid-aluminum salt solution to yield an improved octane FCC gasoline catalyst.

U.S. Pat. No. 3,130,006, which issued to Jule A. Rabo et al, teaches acid or ammonium treatment of Y or L zeolite prior to calcination to produce "decationized" zeolites for use in hydrocracking.

U.S. Pat. No. 3,887,630, which issued to John W. Ward, teaches stabilized Y zeolite for isomerization of alkyl aromatics and is directed to the basic Y-52 to Y-82 processing.

U.S. Pat. No. 4,093,560, which issued to George T. Kerr et al, teaches acid-treatment of NaY or $NH_4Y$ to obtain crystalline dealuminated products. Acid-treatment requires days to accomplish dealumination. This patent teaches the required characteristics of the acid component (ionization constants) for controlled dealumination. Rare earth is incorporated in an FCC matrix after acid treatment of Y.

SUMMARY OF THE INVENTION

The present invention is directed to novel catalyst bases prepared by sequentially hydrothermally treating followed by low pH ammonium ion exchange of a previously ammonium ion exchanged sodium Y zeolite, and to catalysts incorporating same, as well as to catalytic processes including hydrocracking processes for the production of gasoline products and fluid catalytic cracking processes utilizing such catalysts.

DESCRIPTION OF THE INVENTION

It has been found that a particularly advantageous catalyst for hydrocracking processes for the production of gasoline products involves a catalyst system combining hydrogenation catalyst components and a zeolite material which is derived from sodium Y zeolite by hydrothermal treatment of ammonium exchanged sodium Y zeolite followed by low pH ammonium ion exchange.

Additionally, it has been also found that rare-earth exchanged ammonium Y zeolites may also be advantageously hydrothermally treated and subsequently subjected to selective low pH ammonium ion exchange to produce a zeolitic component for a hydrocracking catalyst which exhibits high activity.

The aforementioned hydrothermal treatment and selective low pH ammonium exchange of a sodium Y zeolite which has been previously ammonium exchanged produces a highly crystalline Y-zeolite catalyst base exhibiting high surface area, low soda and having bulk and/or framework silica:alumina molar ratios between 6.5 to 20.0. Judicious selection of the exchange pH condition will determine whether dealumination is limited to non-framework aluminum debris or to include framework aluminum.

Combining hydrothermal treatment and selective low pH ammonium ion exchange of rare-earth exchanged Y-zeolite which has been previously ammonium exchanged produces a further novel form of zeolite catalyst base. A narrow range of steaming temperatures and ammonium exchange pH yields a catalyst base with appropriate silica:alumina ratios and residual rare-earth content for a highly active catalyst.

According to the present invention, the improved catalyst employs a Y-zeolite product treated by first ammonium exchanging a sodium Y zeolite followed by high temperature steaming and subsequent selective low pH ammonium exchange. The alternative procedure of treating a previously rare-earth ammonium exchanged Y-zeolite allows one to produce a zeolite base with more selective removal of non-framework alumina species. The zeolite bases provided by the preparation process disclosed in the present invention represents an improvement over the state of the art recognized LZ-210 zeolites which are currently employed extensively as zeolitic components of crystalline hydrocracking catalysts.

The products of the present invention are intended to be a highly crystalline dealuminated stabilized Y zeolite containing minimal amounts of non-framework alumina (bulk $Si/Al_2$ = framework $Si/Al_2$). By preferentially employing a steam calcination temperature of from about 600° C. to about 725° C. and low pH ammonium exchange (pH<4) treatment of an ammonium Y zeolite, the following range of properties can be achieved:

| | |
|---|---|
| Unit Cell | 24.34–24.58 Angstrom |
| Crystallinity (vs Y-52 std) | 85–100% |
| Bulk $Si/Al_2$ | 8.0–18.0 |
| Surface Area | >735 m$^2$/g |
| Residual Soda | 0.15 Wt % |

$Si^{29}$-NMR MAS data support the concept that combined salt/acid treatment removes practically all extraneous alumina from a steam stabilized Y zeolite, and that "acid only" treatment of a steamed stabilized Y cannot remove non-framework alumina as efficiently. As can be seen in Table A below, steam calcining $NH_4Y$ to produce steam stabilized Y results in significant (40–60%) dealumination of the framework. Commercially produced LZY-82, which is the ammonium exchanged form of LZY-72, has more than 30% of its aluminum (calculated as $Al_2O_3$) disassociated from the zeolite framework. This alumina debris lowers zeolite surface area and restricts accessibility to catalytically active acid sites. S-Y-2 with framework dealumination over 50% is cleaned of its alumina debris by salt/acid treatment in Example VI (% non-framework $Al_2O_3$ = 8.1%). The same steamed stabilized Y treated with $HNO_3$ in the absence of $NH_4NO_3$ (Example X) contained 24% non-framework $Al_2O_3$.

TABLE A

| | $Si^{29}$ NMR MAS Analysis | | | |
|---|---|---|---|---|
| | Bulk[1] $SiO_2/Al_2O_3$ | Framework[2] $SiO_2/Al_2O_3$ | % Extraneous $SiO_2$ | % Extraneous $Al_2O_3$ |
| LZY-72 | 5.1 | 7.9 | 8.3 | 40.6 |
| LZY-82 ($NH_4NO_3$) | 5.4 | 7.7 | 6.1 | 34.2 |
| S-Y-2 | 5.0 | 10.7 | 7.9 | 57.1 |
| Ex. VI ($NH_4NO_3/HNO_3$) | 12.1 | 11.6 | 12.1 | 8.1 |
| Ex. X ($HNO_3$) | 9.8 | 11.6 | 10.1 | 24.0 |

[1] By chemical analysis
[2] By NMR analysis

The Y Zeolites provided by the process of the present invention exhibits favorable catalytic and selectivity characteristics in gasoline hydrocracking as compared with LZ-210 zeolite based hydrocracking catalysts, at a substantial cost advantage.

Also the novel forms of zeolite catalyst bases provided for by this invention exhibit favorable catalytic characteristics when used as part of FCC catalyst systems in place of all or part of the presently used zeolite component thereof.

DESCRIPTION OF SPECIFIC TREATMENT CONDITIONS (1) First Ammonium Exchange.

Sodium Y zeolite (NaY) is ammonium exchanged to lower soda content (<3.0 and preferably to about 2.5 wt% $Na_2O$). This step is carried out by three-stage ion exchange with 15 wt% ammonium nitrate aqueous solution, using 1.0 lb. $NH_4NO_3$ per 1.0 lb. NaY, at 85° C. for 1.0 hour at each stage. The zeolite is washed between stages with 2 gal. $H_2O$ per 1.0 lb. NaY. The exchanged zeolite is subsequently dried at 100° C. to an LOI (1000° C.) = 18.25 wt%.

In the laboratory, the ion exchanges were carried out via a three-necked flask equipped with stirrer, reflux condenser, heating mantle and thermo-watch temperature controller. Slurries were separated and washed on Büchner funnels with Watman #52 filter paper.

(2) Steaming Step.

Ammonium exchanged zeolite Y ($NH_4Y$) is subjected to hydrothermal treatment to lower its unit cell size. $NH_4Y$ is exposed to 100% steam at a temperature of 550–850° C., preferentially at a temperature of from about 600 to about 725° C., for 1.0 hour. In the laboratory, this was accomplished with a vertical tube furnace positioned above a 22-liter flask containing boiling distilled $H_2O$.

(3) Second (Low pH) Ammonium Exchange.

The low pH ammonium exchange was carried out in an identical manner to the first ammonium ion exchange step except that specific quantities of nitric acid were added to the exchange slurry at the beginning of each stage. Any other suitable acid, organic or mineral, may also be employed which will not result in the formation of insoluble aluminum salts. The amount of nitric acid added to the exchange slurry determines the resultant chemical composition and physical properties of the product. Exchange slurry pH was lowered at each stage with decreasing amounts of nitric acid. The slurry pH was adjusted with $HNO_3$ at the beginning of each stage of exchange without further addition of $HNO_3$. For the process to be effective, the initial slurry pH has to be lowered from 4.3±0.3 to pH <4.0. Experiments were reproduced by repeating identical HNO₃ dosages—not by controlling slurry pH. Acid addition was reported on a per gram of starting Y zeolite basis. The actual ratio of HNO₃ to Y zeolite is higher than the reported quantity for second and third stages, since dealumination results in a net weight loss of material after the first stage of exchange. The preferred range of slurry pH or HNO₃ dosages depends on the desired product. The specific HNO₃ dosages are detailed in Examples I-X.

(4) Rare Earth Exchange Route.

An alternative route that results in a zeolitic material with enhanced thermal stability can be realized by ion exchange of NH₄Y with rare earth chlorides prior to hydrothermal treatment. A mixed rare earth chloride salt containing approximately 60% La₂O₃ is contacted with NH₄Y (0.386 grams RECl₃ per gram NH₄Y) in an aqueous slurry heated to 85-95° C. to yield a rare earth content of 8.5-12.0 wt% RE₂O₃ on the zeolite. The subsequent treatments are the same as those described above for NH₄Y except specific conditions such as steaming temperature and slurry pH are defined to produce a zeolite that is an effective hydrocracking catalyst base. The preparations of rare-earth exchanged dealuminated Y zeolites are provided in Examples XI-XVI.

While the invention has been generally described above, the invention will be better understood by recourse to the following examples.

EXAMPLES

Example I 50 grams anhydrous of commercially-produced stabilized zeolite Y (Y-72) were slurried in a 15 wt% ammonium nitrate aqueous solution containing 50 grams of NH₄NO₃. The slurry pH was lowered from 4.10 to 2.15 upon addition of 12.7 grams of 70% HNO₃ aqueous solution. The mixed slurry was heated to 85° C. and its temperature maintained for 60 minutes. The heated slurry was then filtered in a Büchner funnel on Watman #52 filter paper. The filter cake was washed with 834.5 ml of distilled H₂O. This completed the first stage of ion exchange treatment.

The washed filter cake, after drying at 100° C. for 1.5 hours, was slurried again in a 15 wt% ammonium nitrate solution (50 grams NH₄NO₃). The slurry pH was lowered from 4.02 to 2.33 by addition of 4.25 grams of 70% HNO₃ aqueous solution. The slurry was heated to 85° C., and after 60 minutes, filtered and washed with 834.5 ml of distilled H₂O on a Büchner funnel.

The same procedure was followed for the third stage of the ion exchange treatment except the amount of 70% HNO₃ was reduced to 1.75 grams. The addition of HNO₃ lowered slurry pH from 3.39 to 2.48.

The starting material for this aqueous low pH ion exchange treatment, Y-72, has a unit cell constant=24.520 Å, an SiO₂/Al₂O₃ molar ratio=5.15, and a soda content of 2.8 wt%. The resulting product from Example I had a unit cell constant Of 24.554 Å, a SiO₂/Al₂O₃ ratio of 8.08 and a residual soda content of 0.10 wt%. The relative crystallinity of the starting material and the treated product were 91% and 110% respectively, versus a sodium Y zeolite reference X-ray spectrum. These results as well as those of Examples II-X are summarized in Table 1.

Example II

Using 1558.2 grams anhydrous of Y-72, the procedures of Example I were repeated except for the amounts of HNO₃ added to the slurry which were increased as follows:

| Stage | 1 | 2 | 3 | |
|---|---|---|---|---|
| HNO₃ Addition (gms. 70% HNO₃/gm. Y-72) | 0.396 | 0.141 | 0.056 | Σ = 593 |
| Initial Adjusted Slurry pH | 2.35 | 2.11 | 1.97 | |

Example III

Using 60 grams anhydrous of Y-72, the procedures of Example I were again repeated except for the HNO₃ dosages which were:

| Stage | 1 | 2 | 3 | |
|---|---|---|---|---|
| HNO₃ Addition (gms. 70% HNO₃/gm. Y-72) | 0.685 | 0.236 | 0.068 | Σ = .989 |
| Initial Adjusted Slurry pH | 1.5 | 1.5 | 1.5 | |

Example IV

The identical procedures of Example I were repeating using 60 grams grams anhydrous of Y-72, except that HNO₃ was not added to the slurry at any of the three stages. Slurry pH's ranged from 3.6 to 4.5.

Example V

In a fixed bed, ammonium exchanged NaY (2.8 wt% Na₂O) was hydrothermally treated at 700° C. for 1.0 hour in the presence of 1 100% steam to lower the unit cell constant from 24.705 Å to 24.466 A and to retain 85% crystallinity. This steamed Y zeolite (S-Y-2) was used as starting material in treatments described in Examples V-X.

Using 590 grams anhydrous of S-Y-2, the procedure of Example I was repeated except for the HNO₃ dosages which were as follows:

| Stage | 1 | 2 | 3 | |
|---|---|---|---|---|
| HNO₃ Addition (gms. 70% HNO₃/gm. S-Y-2) | 0.099 | 0.028 | 0.014 | Σ = .141 |
| Initial Adjusted Slurry pH | 2.88 | 3.35 | 3.39 | |

Example VI

The procedures of Example I were repeated, using 1814.4 grams of anhydrous S-Y-2 and the following acid dosages:

| Stage | 1 | 2 | 3 | |
|---|---|---|---|---|
| HNO₃ Addition (gms. 70% HNO₃/gm. S-Y-2) | 0.396 | 0.141 | 0.056 | Σ = .593 |
| Initial Adjusted Slurry pH | 1.65 | 1.93 | 1.78 | |

Example VII

The procedures of Example I were again repeated, using 426.4 grams anhydrous of S-Y-2, with the following acid dosages:

| Stage | 1 | 2 | 3 | |
|---|---|---|---|---|
| HNO₃ Addition (gms. 70% HNO₃/gm. S-Y-2) | 0.664 | 0.240 | 0.057 | Σ = .961 |

-continued

| Stage | 1 | 2 | 3 |
|---|---|---|---|
| Initial Adjusted Slurry pH | .0.63 | 0.98 | 1.02 |

Example VIII

Using 250 grams anhydrous of S-Y-2, the procedures of Example I were repeated in the absence of HNO₃. Slurry pH's ranged from 3.6 to 4.9.

Example IX

Using 30 grams anhydrous of S-Y-2, the procedures of Example V were repeated in the absence of ammonium nitrate.

Example X

Using 30 grams anhydrous of S-Y-2, the procedures of Example VI were repeated in the absence of ammonium nitrate.

Example XI

Ammonium ion exchanged Y zeolite (2.8 wt% $Na_2O_3$) was subjected to rare earth ion exchange with a mixed rare earth chloride (60% $La_2O_3$). Four pounds of NH₄Y were slurried in an aqueous solution containing 1.544 lbs. $RECl_3$ (4.6 wt% $RECl_3$ aqueous solution) and heated to 93° C. After 1.0 hour at 93° C., the exchange slurry was filtered and the filter cake washed with 32 gallons distilled $H_2O$. The resulting REY contained 11.5 wt% $RE_2O_3$.

REY was hydrothermally treated at 600° C. for 1.0 hour in the presence of 100% steam. This material was labelled as RSY600.

200 grams anhydrous of RSY600 were then slurried in a 15 wt% ammonium nitrate solution containing 200 grams NH₄NO₃ to yield a slurry pH of 3.82. The procedures of Example 5 were followed using the following HNO₃ dosages:

| Stage | 1 | 2 | 3 | |
|---|---|---|---|---|
| HNO₃ Addition (gms. 70% HNO₃/gm. RSY600) | 0.099 | 0.028 | 0.014 | Σ = .141 |
| Initial Adjusted Slurry pH | 2.38 | 2.70 | 3.04 | |

The results of Examples XI–XVI are summarized in Table 2.

Example XII

The procedures of Example XI were repeated, treating 227 grams anhydrous of RSY600 in low pH ammonium nitrate solutions using the following amounts of HNO₃:

| Stage | 1 | 2 | 3 | |
|---|---|---|---|---|
| HNO₃ Addition (gms. 70% HNO₃/gm. RSY600) | 0.396 | 0.141 | 0.056 | Σ = .593 |
| Initial Adjusted Slurry pH | 1.62 | 1.80 | 1.80 | |

Example XIII

The procedures of Example XI were repeated using 30.0 grams anhydrous of RSY600 except that HNO₃ was not added to the slurry.

Example XIV

REY (11.5 wt% $RE_2O_3$) was subjected to hydrothermal treatment at 700° C. for 1.0 hour in the presence of 100% steam. The steamed material was labelled RSY700. 200 grams anhydrous of RSY700 were slurried in a 15 wt% NH₄NO₃ solution containing 200 grams NH₄NO₃. The slurry pH was measured at 3.86.

The procedures of Example XI were then followed, including the HNO₃ dosages:

| Stage | 1 | 2 | 3 | |
|---|---|---|---|---|
| HNO₃ Addition (gms. 70% HNO₃/gm. RSY700) | 0.099 | 0.028 | 0.014 | Σ = .141 |
| Initial Adjusted Slurry pH | 2.30 | 2.79 | 3.21 | |

Example XV

Using 227 grams anhydrous of RSY700, the procedures of Example XII were repeated including the HNO₃ dosages:

| Stage | 1 | 2 | 3 | |
|---|---|---|---|---|
| HNO₃ Addition (gms. 70% HNO₃/gm. RSY700) | 0.396 | 0.141 | 0.056 | Σ = .593 |
| Initial Adjusted Slurry pH | 1.58 | 1.96 | 1.67 | |

Example XVI

The procedures of Example XIV were repeated using 30.0 grams anhydrous of RSY700 except that HNO₃ was not added to the slurry.

Example XVII

This sample illustrates the method of preparing a catalyst which incorporates the novel zeolite catalyst base. A catalyst blank was prepared by mulling a physical mixture of 1075.53 grams (anhydrous) zeolite described in Example VI, with 268.88 grams of peptized pseudoboehmite and extruding 1/16" diameter pellets of this composition (80%/20%). The pseudoboehmite was contacted with 336.0 grams of a 12 wt% HNO₃ solution and mixed until a homogeneous paste was obtained. In order to prepare an extrudable mix in the muller, $H_2O$ was added to yield an LOI (1000° C.) of 47.5 wt%. Upon drying at 100° C. overnight to lower LOI (1000° C.) to 12.97 wt%, the pellets were calcined in a rotary kiln at a maximum temperature of 600° C., using 200 SCFH dry air and 60 minutes retention time. The calcined catalyst blanks had an LOI (1000° C.) of 1.43 wt% and an apparent $H_2O$ pore volume capacity of 0.678 cc/gm.

The calcined catalyst blanks (619.61 gms.) were subsequently metal loaded via contacting in a tumbling glass jar with an aqueous solution containing 162.92 grams of nickel nitrate hexahydrate and 195.38 grams of ammonium metatungstate to yield, on a finished catalyst basis, 5 wt% NiO and 21 wt% $WO_3$. Following metal loading, the pellets were dried at 100° C. overnight and calcined in a rotary kiln at a maximum temperature of 500° C. with 200 SCFH air purge and 60 minute retention time.

Catalyst test results for Examples XVII–XIX can be found in Table 3.

Example XVIII

The procedures of Example XVII were repeated using as zeolite catalyst base the material described in Example II to produce 400 grams of finished catalyst.

Example XIX

A catalyst was prepared by mulling a physical mixture of 44.45 grams ammonium metatungstate, 39.37 grams of nickel nitrate hexahydrate, 42.20 grams of peptized pseudoboehmite and 147.37 grams of zeolite catalyst base described in Example 1. Water was added during mulling to yield an extrudable rheology at 45.4 wt% LOI (500° C.). The mull mixture was extruded as 1/8" diameter pellets and dried at 100° C. overnight (LOI [500° C.]=16.1 wt%). The pellets were placed in a wire mesh tray and then calcined in a Blue-M box oven at 220° C. for 1.0 hour, followed by calcination at 500° C. for 1.0 hour, with 70 SCFH air purge. The finished catalyst contained 5.0 wt% NiO and 19.6 wt% $WO_3$.

Example XX

In this example, the zeolite described in Example XI was loaded with 1.0 wt% Pd using a $Pd(NH_3)_4Cl_2$ complex solution and used to prepare a finished catalyst. A palladium tetramine chloride complex was prepared by mixing 2.38 grams of $PdCl_2$. 8.26 grams of $NH_4OH$ and 5.26 grams of distilled water and heating to 80° C. (1 hour). After 1.0 hour of mixing, the solution was cooled and diluted with 485.8 grams of distilled $H_2O$.

A 16.7 wt% solids aqueous slurry containing 141.96 grams (anhydrous) of the zeolite described in Example XI, and 7.1 grams $NH_4OH$ was prepared.

The palladium tetramine complex was added to the slurry over a 40 minute period. The slurry was filtered over Watman #52 paper and washed with 2369.4 grams of distilled $H_2O$. The zeolite, containing 1.0 wt% Pd., was dried at 100° C. overnight.

120 grams of the palladium exchanged zeolite were added to 30 grams of peptized pseudoboehmite and mulled. Water was added to yield an extrudable rheology (LOI [500° C.]=44.0 wt%). Pellets extruded with 1/8" diameter were dried overnight at 100° C. in preparation for calcination. The dried pellets were placed in a wire mesh tray and calcined in a Blue-M box oven. The sample was heated to 220° C., held at 220° C. for 1.0 hour, heated to 480° C., held for 1.0 hour and bottled hot. The calcination was carried out in a 70 SCFH dry air purge. The finished catalyst was then hydrated to 5.0 wt% LOI.

Catalyst test results for Examples XX-XXIII can be found in Table 4.

Example XXI

The procedures of Example XX were repeated using the rare earth exchanged zeolite described in Example XII.

Example XXII

The procedures of Example XX were repeated using the rare earth exchanged zeolite described in Example XIV.

Example XXIII

The procedures of Example XX were repeated using the rare earth exchanged zeolite described in Example XV.

Example XXIV

The procedures of Example XVII were repeated, on a commercial scale, to produce a Ni-W catalyst containing steam calcined and ammonium exchanged LZ-210 ($SiO_2/Al_2O_3=12$).

Example XXV

The procedures of Example XX were repeated, on a commercial scale, to produce a Pd-loaded catalyst containing steam calcined and ammonium exchanged RE-210 ($SiO_2/Al_2O_3=6.5$).

In the following Examples (XXVI-XXX), the zeolite Y used in the sequential steam calcination and low pH ammonium ion exchange was commercially prepared using an alternate preparation and raw materials that resulted in improved zeolite catalyst bases. The surface area of the steam stabilized and low pH exchanged materials is significantly higher. The performance of base metal catalysts (Examples XXXI-XXXIV) containing this zeolite catalyst base dealuminated by the sequential process previously described was further enhanced by the use of the improved zeolite Y source. Not only is catalyst performance markedly improved, but also the optimum $SiO_2/Al_2O_3$ ratio for Ni-W catalysts is shifted from 12.0 to 8-10. In addition, the acid tolerance of the steam stabilized Y is improved, allowing the application of lower steaming temperatures.

Example XXVI

Using 220.63 gms. of a commercially steam stabilized zeolite Y (S-Y-3) with a unit cell size of 24.54 Å and surface area of 821 $m^2/g$., the procedures described in Examples I-VIII were repeated using the following amount of $HNO_3$.

| Stage | 1 | 2 | 3 | |
|---|---|---|---|---|
| $HNO_3$ Addition (gms. 70% $HNO_3$/gm. S-Y-3) | .388 | .139 | .052 | ($\Sigma$ = .579) |
| Initial Adjusted Slurry pH | 2.37 | 2.12 | 2.06 | |

The resulting product had a unit cell size of 24.530 Å, $SiO_2/Al_2O_3$ ratio of 10.0, surface area of 955 $m^2/g$. and a sodium oxide content of <0.06 wt%. This product had a relative crystallinity of 101%. These results as well as those of Examples XXVII-XXX are summarized in Table I.

Example XXVII

The procedures of Example I were repeated using 14 lbs. of S-Y-3 and the following $HNO_3$ dosages:

| Stage | 1 | 2 | 3 | |
|---|---|---|---|---|
| $HNO_3$ Addition (gms. 70% $HNO_3$/gm. S-Y-3) | .254 | .085 | .035 | ($\Sigma$ = .374) |
| Initial Adjusted Slurry pH | 2.60 | 2.40 | 2.57 | |

Example XXVIII

The procedures of Example I were repeated using 51 gms. of S-Y-3 and the following $HNO_3$ addition:

| Stage | 1 | 2 | 3 | |
|---|---|---|---|---|
| $HNO_3$ Addition (gms. 70% $HNO_3$/gm. S-Y-3) | .474 | .170 | .064 | ($\Sigma$ = .708) |

-continued

| Stage | 1 | 2 | 3 |
|---|---|---|---|
| Initial Adjusted Slurry pH | 2.16 | 1.88 | 1.68 |

Example XXIX

Using 1.0 lb. of steam stabilized Y (S-Y-4) having an $a_o=24.465$ and surface area of 732 m$^2$/g., the procedures described in Example I were repeated using the following HNO$_3$ addition during ammonium ion exchange:

| Stage | 1 | 2 | 3 | |
|---|---|---|---|---|
| HNO$_3$ Addition (gms. 70% HNO$_3$/gm. S-Y-4) | .396 | .141 | .056 | ($\Sigma$ = .593) |
| Initial Adjusted Slurry pH | 1.69 | 2.00 | 1.71 | |

Example XXX

Using 3.75 lb. of commercially produced steam stabilized zeolite Y (S-Y-5) having $a_o=24.513$ Å, surface area of 760 m$^2$/g. and 3.2 wt% Na$_2$O, the procedures described in Example I were repeated using the following HNO$_3$ dosages:

| Stage | 1 | 2 | 3 | |
|---|---|---|---|---|
| HNO$_3$ Addition (gms. 70% HNO$_3$/gm. S-Y-5) | .474 | .170 | 0.64 | ($\Sigma$ = .703) |
| Initial Adjusted Slurry pH | 2.00 | 1.79 | 1.68 | |

Example XXXI

The procedures of Example XVII were repeated using as zeolite catalyst base the material described in Example XXVI to produce a Ni-H base metal hydrocracking catalyst. Catalytic test results for Example XXXI-XXXIV can be found in Table 3.

Example XXXII

The procedures of Example XVII were repeated using as zeolite catalyst base the material described in Example XXVII to produce a Ni—W hydrocracking catalyst.

Example XXXIII

The procedures of Example XVII were repeated using as zeolite catalyst base the material described in Example XXIX to produce a Ni—W hydrocracking catalyst.

Example XXXIV

The procedures of Example XVII were repeated using as zeolite catalyst base the material described in Example XXX to produce a Ni—W hydrocracking catalyst.

Hydrocracking Catalyst Evaluation

Catalysts prepared utilizing the procedures described above were evaluated for hydrocracking activity in separate runs wherein a gas oil feed plus added hydrogen is passed through a laboratory size reactor vessel containing 50 cc of catalyst under the following conditions: 1450 psia, 1.7 LHSV and a hydrogen-to-oil ratio of 8000 SCF/bl. The gas oil feed was a denitrogenated, unconverted fraction obtained from a previous integral hydrofining hydrocracking operation which had a boiling range of about 325–768° F. with about 5% by volume of the feed boiling below 400° F. Two different feeds were used. Feed A had an API gravity of 37.2 and Feed B an API gravity of 38.6.

To simulate first-stage hydrocracking in an H$_2$S/NH$_3$ containing atmosphere, thiophene and tert-butylamine were blended with the feedstock to provide respective sulfur and nitrogen concentrations of about 0.5 and 0.2 wt%. The operating temperature utilized in the reactor vessel was adjusted to maintain a total liquid product gravity of 47 API which corresponds to about 40 volume percent conversion of the feedstock to a C$_4°$ to 420° F. gasoline product.

To simulate second-stage hydrocracking where an H$_2$S atmosphere is required, thiophene was added to the feedstock to provide a sulfur concentration of about 0.5 wt%. In this second-stage hydrocracking simulation, the operating temperature utilized in the reactor vessel was adjusted periodically to maintain a total liquid product gravity of 49.5 API corresponding to about a 60 volume percent conversion of the feedstock to a C$_4$ to 420° F. gasoline product.

The reported activity of the catalysts was compared against a commercial reference hydrocracking catalyst. The second stage performance of a given catalyst was evaluated by determining the temperature at which 49.5 API gravity was attained after 100 hours on-stream. First stage activity was defined by the temperature required to obtain 47 API gravity after 100 hours on-stream. The temperature difference between the catalyst under test and the reference catalyst is expressed as a delta value.

A positive value indicates a decreased activity, while a negative value indicates improved performance compared to the reference. Second and first stage hydrocracking activity test results are summarized in Tables 3 and 4.

FLUID CATALYTIC CRACKING CATALYST PREPARATION AND EVALUATION

Example XXXV

A sample of fluid catalytic cracking catalyst was prepared, according to the procedure outlined in Example I, containing approximately 35% zeolite, in a silica/alumina/clay matrix which comprised 39% by weight of clay and 26% by weight of silica/ alumina binder. The properties of this catalyst as compared to a reference catalyst comprising a typical commercial catalyst, which consists of 35 wt% of a USY type zeolite, with a similar clay/silica/alumina matrix is set forth in Table 5.

Example XXXVI

The commercial FCC reference catalyst and the low pH ammonium Y based catalyst of Example XXXV were both steamed at 1350° F. for 14 hours with 100% steam. The properties of both catalysts are set forth in Table 5. The catalysts were then run in an experimental FCC reactor at 3, 4, 5, and 6 catalyst-to-oil ratios. The reactor temperatures used for cracking and stripping were varied along with the catalyst-to-oil ratio. They were 945, 960, 975° and 990° F., respectively. The temperature used for catalyst regeneration was 1300° F.

The feedstock used for these runs was Total HVGO, the characteristics of which are shown in Table 6.

The product yields at conversion are set forth in Table 7.

The data presented in Table 7 clearly illustrate that a product having superior research octane and comparable product yields on a wt% basis can be achieved utilizing an FCC catalyst of the present invention as compared to a commercial reference Y zeolite based catalyst which has not been prepared in accordance with the teaching of the present invention.

offers performance advantages in the FCC application compared to existing USY and LZ-210 zeolite based commercial FCC catalysts. At 70% conversion, the catalyst containing Y zeolite prepared in accordance with the teaching of the present invention produced higher research and motor octane than USY and LZ-210 based catalysts, without sacrificing its selectivity for gasoline yield.

TABLE 1

Summary of Properties
Example I-X and XXVI-XXX

| Exp. | $NH_4NO_3$ | $HNO_3$ | Cum.* $HNO_3$ Dosage | Å $a_o$ | % X-Ray Intensity | Bulk $SiO_2/Al_2O_3$ | % wt $Na_2O$ | Surface Area $M^2/g$ |
|---|---|---|---|---|---|---|---|---|
| Y-72 | — | — |  | 24.520 | 91 | 5.15 | 2.8 | 718 |
| I |  |  | 0.374 | 24.554 | 110 | 8.08 | 0.10 | 838 |
| II |  |  | 0.593 | 24.488 | 91 | 9.84 | 0.13 |  |
| III |  |  | 0.989 | 24.374 | 33 | 22.1 | 0.06 | 642 |
| IV |  | — | — | 24.589 | 92 | 5.50 | 0.14 | 798 |
| S-Y-2 | — | — |  | 24.466 | 85 | 5.00 | 2.8 | 635 |
| V |  |  | 0.141 | 24.483 | 93 | 8.00 | 0.19 | 737 |
| VI |  |  | 0.593 | 24.439 | 98 | 12.1 | 0.13 | 795 |
| VII |  |  | 0.961 | 24.343 | 74 | 19.2 | 0.11 | 773 |
| VIII |  | — |  | 24.481 | 85 | 5.69 | 0.36 | 691 |
| IX |  | — | 0.141 | 24.463 | 84 | 5.49 | 0.50 | 681 |
| X |  | — | 0.593 | 24.439 | 91 | 9.80 | 0.29 | 761 |
| S-Y-3 | — | — | — | 24.540 | 89 | 5.1 | 2.9 | 821 |
| XXVII |  |  | 0.374 | 24.580 | 111 | 8.0 | 0.06 | 902 |
| XXVI |  |  | 0.578 | 24.530 | 101 | 10.0 | <.06 | 955 |
| XXVIII |  |  | 0.708 | 24.481 | 94 | 11.9 | 0.04 | 968 |
| S-Y-4 | — | — | — | 24.465 | 91 | 5.1 | 2.8 | 732 |
| XXIX |  |  | 0.593 | 24.457 | 106 | 13.8 | 0.08 | 938 |
| S-Y-5 | — | — | — | 24.513 | 115 | 5.0 | 3.2 | 760 |
| XXX |  |  | 0.708 | 24.463 | 99 | 13.1 | 0.07 | 945 |

*gms 70% $HNO_3$/gm. Y (anhydrous).

TABLE 2

Summary of Properties
Examples XI-XVI

| Exp. | Cum. $HNO_3$ Dosage | Å $a_o$ | % X-Ray Intensity | Bulk $SiO_2/Al_2O_3$ | wt % $RE_2O_3$ | wt % $Na_2O$ | Surface Area. $m^2/g$ |
|---|---|---|---|---|---|---|---|
| $NH_4Y$ | — | 24.705 | 104 | 5.01 | — | 2.8 | 844 |
| REY | — | 24.682 | 53 | 4.96 | 11.5 | 2.2 | 788 |
| RSY600 | — | 24.636 | 44 |  |  |  | 571 |
| XI | 0.141 | 24.646 | 46 | 5.80 | 10.5 | 0.04 | 770 |
| XII | 0.593 | 24.583 | 49 | 8.69 | 5.4 | 0.05 | 826 |
| XIII | — | 24.651 | 45 | 5.28 | 11.2 | 0.06 | 727 |
| RSY700 | — | 24.602 | 40 |  |  |  | 556 |
| XIV | 0.141 | 24.596 | 48 | 6.20 | 10.1 | 0.09 | 718 |
| XV | 0.593 | 24.537 | 52 | 9.13 | 5.7 | 0.13 | 785 |
| XVI | — | 24.619 | 42 | 5.13 | 11.3 | 0.12 | 718 |

Example XXXVII

The procedures described in Example XXXV were repeated using the zeolite catalyst base described in Example XXVII, which is a high surface area (902 m²/g) dealuminated Y (Si/Al₂=8.0). This catalyst was compared to a commercial USY containing FCC catalyst and a commercial LZ-210 containing FCC catalyst. The properties of the low pH ammonium ion exchanged stabilized Y based catalyst, along with those of the commercial catalysts, are summarized in Table 8.

Example XXXVIII

The catalyst described in Example XXXVII was tested according to the procedures outlined in Example XXXVI, except for steaming temperature which was 1450° F., and compared to commercial USY and LZ-210 containing FCC catalysts. The product yields at constant conversion, shown in Table 9, illustrate that low pH ammonium ion exchanged stabilized Y zeolite

TABLE 3

Finished Catalyst Performance.
Gasoline Hydrocracking: First and Second Stage
Base Metal Zeolite Catalysts

| Catalyst (Example #) | Zeolite (Example #) | (Feed A) Catalytic Activity | | (Feed B) Catalytic Activity | |
|---|---|---|---|---|---|
|  |  | First Stage* | Second Stage* | First Stage* | Second Stage* |
| XVII | VI | −12 | −10 |  |  |
| XVIII | II | −3 | −1 |  |  |
| XIX | I | −5 | −13 |  |  |
| Control (XXIV) | LZ-210-8(12)** | −13 | +25 | −21 | +15 |
| XXXI | XXVI | −16 | −24 | −10 | −14 |
| XXXII | XXVII |  |  | −13 | −15 |
| XXXIII | XXIX | −16 | −5 |  |  |

TABLE 3-continued

Finished Catalyst Performance
Gasoline Hydrocracking: First and Second Stage
Base Metal Zeolite Catalysts

| Catalyst (Example #) | Zeolite (Example #) | (Feed A) Catalytic Activity First Stage* | (Feed A) Catalytic Activity Second Stage* | (Feed B) Catalytic Activity First Stage* | (Feed B) Catalytic Activity Second Stage* |
|---|---|---|---|---|---|
| XXXIV | XXX | −19 | −13 | −14 | −4 |

*Activity is reported as difference from reference catalyst activity ($\Delta T = T_{test} - T_{ref}$). Reference catalyst, 60% LZY-82, 5% NiO and 15% MoO$_3$.
**Steamed and ammonium exchanged LZ-210, having a Si/Al ratio of 12 prior to steaming and ammonium exchange.

TABLE 4

Finished Catalyst Performance
Gasoline Hydrocracking: First and Second Stage
Noble Metal Zeolite Catalysts

| Catalyst (Example #) | Zeolite (Example #) | Catalytic Activity First Stage* | Catalytic Activity Second Stage* |
|---|---|---|---|
| XX | XI | −3 | −3 |
| XXI | XII | +14 | +6 |
| XXII | XIV | −12 | −17 |
| XXIII | XV | +3 | +10 |
| Control(XXV) | RE-210-8(6.5)** | −11 | −20 |

*Activity is reported as difference from reference catalyst activity ($\Delta T = T_{TEST} - T_{REF}$). Reference catalyst contains 80% LZY-82 with 0.54 wt % Pd.
**Steamed and ammonium exchanged rare earth exchanged LZ-210 having a Si/Al ratio of 6.5 prior to steaming and ammonium exchange.

TABLE 5

FCC CATALYST PROPERTIES

| DESCRIPTION | USY BASED COMMERCIAL REFERENCE CATALYST | LOW pH AMMONIUM ION EXCHANGED STABILIZED Y CATALYST (EXAMPLE XXXV) |
|---|---|---|
| FRESH PHYSICAL PROPERTIES: | | |
| PV, cc/g | 0.41 | ******** |
| SA, m$^2$/g | 251 | ******** |
| a$_o$, A | 24.56 | 24.561 |
| FRESH CHEMICAL PROPERTIES: | | |
| Na$_2$O, WT % | 0.33 | 0.09 |
| RE$_2$O$_3$, WT % | 0.00 | 0.007 |
| AL$_2$O$_3$, WT % | 37.00 | ******** |
| STEAMED PROPERTIES: | | |
| SA, m$^2$/g | 169 | 186 |
| a$_o$, A | 24.25 | 24.25 |
| PV, cc/g | 0.36 | 0.35 |

TABLE 6

FEEDSTOCK PROPERTIES

| IDENTITY | TOTAL HVGO |
|---|---|
| GRAVITY, API | 25.9 |
| MOLECULAR WEIGHT | 391 |
| RAMSBOTTOM CARBON, WT % | 0.59 |
| NITROGEN, WT % | 0.993 |
| SULFUR, WT % | 0.53 |
| REFRACTIVE INDEX @ 20° C. | 1.499 |
| ANILINE POINT, F. | 196 |
| POUR POINT, F. | 95 |
| METALS, PPM | |
| Ni | 0.4 |
| V | 2 |
| CALCULATED CARBON COMPOSITION | |
| CA | 14.4 |
| CN | 26.5 |
| CP | 59.1 |
| DISTILLATION, D1160, F. | |
| 5% | 658 |
| 10% | 700 |
| 30% | 782 |
| 50% | 845 |
| 70% | 918 |
| 90% | CRACKED |
| 95% | AT 1035 |

TABLE 7

PRODUCT YIELDS AT CONSTANT CONVERSION

| DESCRIPTION | USY BASED COMMERCIAL REFERENCE CATALYST | LOW pH AMMONIUM ION EXCHANGED STABILIZED Y CATALYST (EXAMPLE XXXV) |
|---|---|---|
| PRODUCT YIELDS: VOL % FF | | |
| C3 | 1.39 | 1.40 |
| C3 = | 6.68 | 7.00 |
| iC4 | 6.38 | 6.24 |
| nC4 | 0.98 | 0.95 |
| C4 = | 8.20 | 8.74 |
| GASOLINE | 64.12 | 62.84 |
| TOTAL C3 − LIQUID | 111.8 | 111.2 |
| PRODUCT YIELDS: WT % FF | | |
| C$_2$— | 1.76 | 1.87 |
| LCO | 17.34 | 17.47 |
| HCO | 8.67 | 8.60 |
| COKE | 2.85 | 3.24 |

TABLE 7-continued

PRODUCT YIELDS AT CONSTANT CONVERSION

| | CATALYST: | |
|---|---|---|
| DESCRIPTION | USY BASED COMMERCIAL REFERENCE CATALYST | LOW pH AMMONIUM ION EXCHANGED STABILIZED Y CATALYST (EXAMPLE XXXV) |
| GASO. PRODUCT INSPEC. | | |
| RON: CLEAR | 90.6 | 92.3 |
| MON: CLEAR | 80.3 | 80.8 |
| OCTANE BBL | | |
| RESEARCH | 5809.3 | 5800.1 |
| MOTOR | 5148.8 | 5077.5 |
| PONA | | |
| PARAFINS | 39.80 | 36.70 |
| OLEFINS | 25.30 | 28.50 |
| NAPTHENES | 9.75 | 9.10 |
| AROMATICS | 25.25 | 25.90 |

TABLE 8

FCC CATALYST PROPERTIES

| | CATALYST: | | |
|---|---|---|---|
| DESCRIPTION | USY BASED COMMERCIAL CATALYST | LZ-210 BASED COMMERCIAL CATALYST | LOW pH AMMONIUM ION EXCHANGED STABILIZED Y CATALYST (EXAMPLE XXXVII) |
| FRESH PROPERTIES | | | |
| SA. $m^2/g$ | 251 | 254 | 258 |
| $a_o$ Å | 24.56 | 24.53 | 24.54 |
| STEAMED PROPERTIES (1450 °F.) | | | |
| SA. $m^2/g$ | 160 | 188 | 205 |
| $a_o$ Å | 24.26 | 24.24 | 24.25 |
| $Na_2O$, WT % | 0.38 | 0.25 | 0.07 |
| $Al_2O_3$, WT % | 33.7 | 26.9 | 32.3 |

TABLE 9

PRODUCT YIELDS AT CONSTANT CONVERSION
(70% Vol. Conversion)

| | CATALYST: | | |
|---|---|---|---|
| DESCRIPTION | Y-82 BASED COMMERCIAL CATALYST | LZ-210 BASED COMMERCIAL CATALYST | LOW pH AMMONIUM ION EXCHANGED STABILIZED Y CATALYST (EXAMPLE XXXVII) |
| PRODUCT YIELDS: VOL % | | | |
| C3 | 1.34 | 1.36 | 1.35 |
| C3 = | 6.81 | 6.53 | 6.84 |
| iC4 | 6.20 | 6.48 | 6.24 |
| nC4 | 1.05 | 1.12 | 1.06 |
| C4 = | 8.55 | 8.21 | 8.76 |
| GASOLINE | 59.16 | 60.23 | 59.25 |
| PRODUCT YIELDS: WT % | | | |
| C2— | 1.56 | 1.53 | 1.52 |
| LCO | 17.06 | 16.73 | 16.90 |
| HCO | 14.86 | 15.26 | 15.26 |
| COKE | 2.10 | 1.65 | 1.88 |
| RESEARCH OCTANE | 90.91 | 90.79 | 92.06 |
| MOTOR OCTANE | 79.27 | 79.81 | 80.61 |

While the invention has been described with respect to various specific Examples and embodiments, it is to be understood that the invention is not limited thereto and that it may be variously practiced within the scope of the following claims:

We claim:

1. A zeolite composition prepared by the process comprising the steps of:

(a) providing a crystalline sodium zeolite Y starting composition and contacting said starting composition with ammonium cations under cation exchange conditions to reduce the $Na_2O$ content of the starting composition to less than 3.0 weight percent;

(b) hydrothermally steaming the ammonium exchanged zeolite Y of step (a) at a temperature of from 550° C. to about 850° C. to reduce the unit cell dimension of the crystal lattice;

(c) contacting the steamed product of step (b) with a sufficient amount of an aqueous solution of ammonium ions having a pH of less than about 4.0 and for a sufficient time to exchange at least some of the residual sodium cations and to increase the bulk $Si/Al_2$ ratio of the composition to the range of 6.5 to 20; and (d) recovering the ion-exchanged and extracted product of step (c).

2. Zeolite composition according to claim 1 wherein in the step (a) the $Na_2O$ content of the product of step (a) is less than 2.5 weight percent and wherein in step (b) the hydrothermal steaming is carried out using 100% steam for a period of about one hour.

3. Zeolite composition according to claim 2 wherein in step (b) the hydrothermal steaming is carried out at a temperature of from about 600° C. to about 725° C.

4. Zeolite composition according to claim 1 wherein the product recovered in step (d) has a unit cell dimension in the range of 24.34 to 24.58 Angstroms, a crystallinity of 85–100%, a bulk $Si/Al_2$ molar ratio of 8.0–18.0 and a surface area of greater than 735 $m^2/g$.

5. Zeolite composition according to claim 1 which contains rare earth cations by virtue of contacting the product of step (a) with rare earth cations under ion-exchange conditions.

6. Zeolite composition according to claim 5 wherein the rare earth exchange step is carried out be contacting a mixed rare earth chloride containing approximately 60% $La_2O_3$ with the $NH_4Y$ in an aqueous slurry which has been heated to about 85–90° C.

* * * * *